United States Patent
Montgelas et al.

(10) Patent No.: US 7,968,805 B2
(45) Date of Patent: Jun. 28, 2011

(54) CABLE CONDUIT SYSTEM

(75) Inventors: Rudolph A. Montgelas, West Hartford, CT (US); Michael J. Hines, Ivoryton, CT (US); Lars R. Larsen, Old Lyme, CT (US); Michael P. Hammond, Ivoryton, CT (US)

(73) Assignee: Milano Innovation Company LLC, Centerbrook, CT (US)

( * ) Notice: Subject to any disclaimer, the term of this patent is extended or adjusted under 35 U.S.C. 154(b) by 560 days.

(21) Appl. No.: 12/008,188

(22) Filed: Jan. 9, 2008

(65) Prior Publication Data

US 2009/0173535 A1 Jul. 9, 2009

(51) Int. Cl.
*H02G 3/22* (2006.01)
*H02G 3/38* (2006.01)

(52) U.S. Cl. ...... 174/505; 174/481; 174/68.3; 174/68.1; 52/220.1; 52/220.3

(58) Field of Classification Search .................. 174/480, 174/481, 68.1, 68.3, 505, 72 R, 88 R, 500; 33/528, DIG. 10; 52/220.1, 220.3, 220.7, 52/239, 220.5, 220.8; 220/3.2, 3.8, 3.3; 439/215
See application file for complete search history.

(56) References Cited

U.S. PATENT DOCUMENTS

| | | | |
|---|---|---|---|
| 3,332,188 A | | 7/1967 | Schaefer |
| 3,377,756 A | | 4/1968 | Polhamus |
| 3,464,052 A | * | 8/1969 | Hukin .......................... 439/215 |
| 3,609,211 A | | 9/1971 | Van Herk |
| 3,814,833 A | | 6/1974 | Yamada et al. |
| 3,888,059 A | | 6/1975 | MacLennan et al. |
| 3,909,502 A | | 9/1975 | Lacan |
| 4,015,397 A | | 4/1977 | Flachbarth et al. |
| 4,354,052 A | | 10/1982 | Albany et al. |
| 4,479,687 A | | 10/1984 | Humphreys et al. |
| 4,512,129 A | | 4/1985 | Riggs |
| 4,800,696 A | | 1/1989 | Miller et al. |
| 5,103,609 A | | 4/1992 | Thoreson et al. |
| 5,327,699 A | | 7/1994 | Khan et al. |
| 5,362,923 A | * | 11/1994 | Newhouse et al. ............. 52/239 |
| 5,784,841 A | * | 7/1998 | Nowell ........................ 52/220.5 |
| 5,899,037 A | | 5/1999 | Josey |
| 6,253,516 B1 | | 7/2001 | D'Andrea et al. |
| 6,360,502 B1 | | 3/2002 | Stahl, Jr. |
| 6,759,589 B1 | * | 7/2004 | VanderVelde ................. 174/481 |
| 6,951,085 B2 | * | 10/2005 | Hodges et al. ............... 52/220.7 |
| 6,972,368 B2 | * | 12/2005 | VanderVelde ................ 52/220.3 |
| 2003/0172602 A1 | | 9/2003 | DeFreitas |
| 2007/0277388 A1 | | 12/2007 | Murphy |

OTHER PUBLICATIONS

International Search Report PCT/US 09/00115, dated Feb. 20, 2009.

* cited by examiner

*Primary Examiner* — Angel R Estrada
(74) *Attorney, Agent, or Firm* — Alix, Yale & Ristas, LLP

(57) ABSTRACT

A cable conduit system for a building frame structure having a bottom plate associated with each floor and a top plate associated with each ceiling. The system comprises a conduit stud and first and second header plates. The conduit stud has at least one cavity extending longitudinally from a first end to a second end. The first header plate is adapted to be fixedly mounted to an upper surface of the frame structure bottom plate and the second plate is adapted to be fixedly mounted to a lower surface of the frame structure top plate, respectively. The first end portion of the conduit stud is locked to the first header plate and the second end portion of the conduit stud is locked to the second header plate.

22 Claims, 8 Drawing Sheets

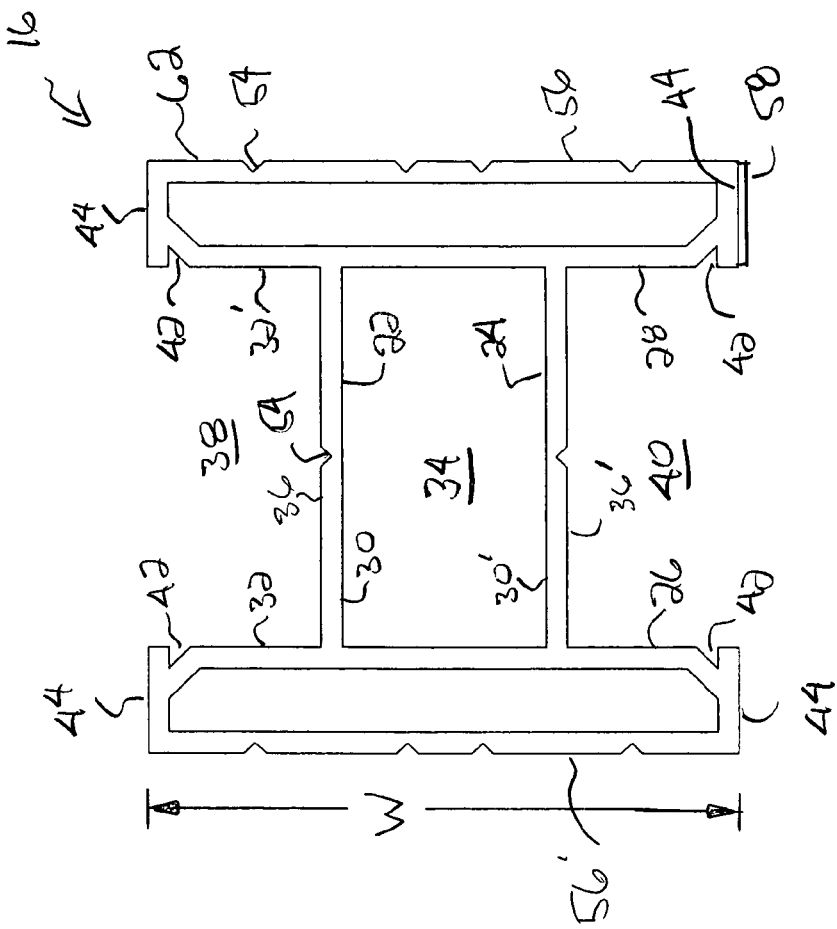
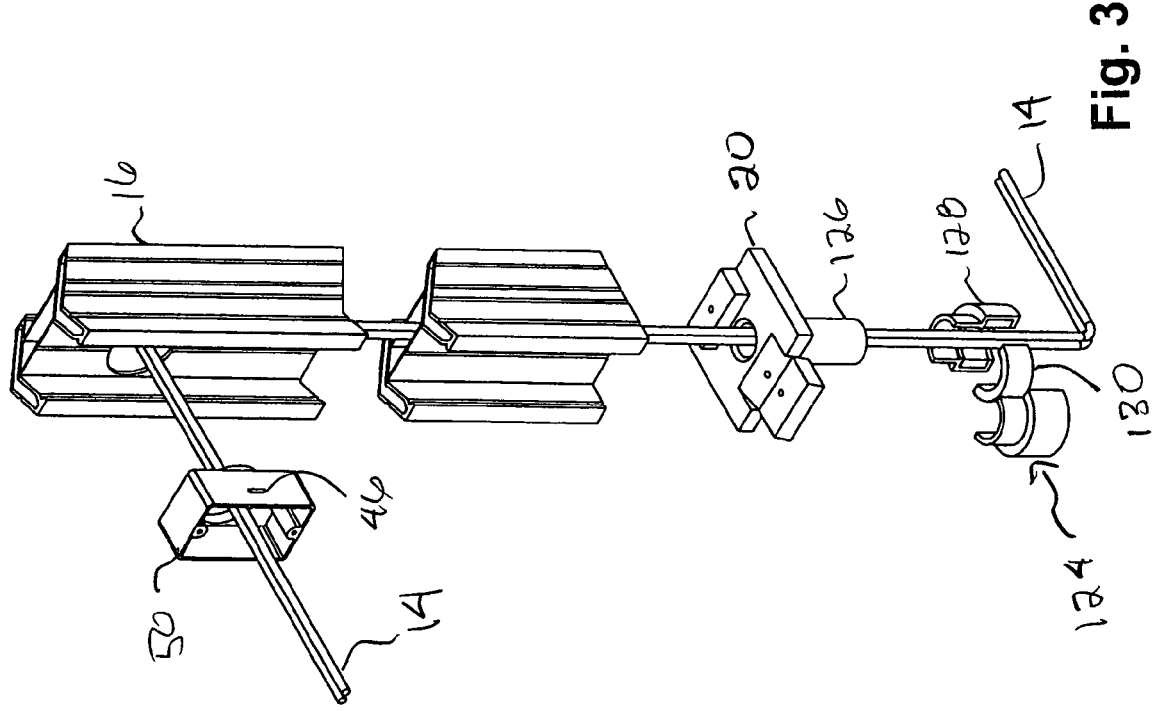

CABLE CONDUIT SYSTEM

BACKGROUND

This disclosure relates generally to apparatus for providing a pathway for cabling in a building. More particularly, the present disclosure relates to apparatus for providing a pathway for cabling in the wall cavities of a building frame structure.

There is an ever-increasing need for faster data speeds to and in the home for DSL, Cable Modem, FTTH, Ethernet, Fast Ethernet, Gigabit Ethernet systems, etc. This demand for faster data transmission speeds require that cabling systems be flexible to accommodate upgrades in applications such as data, video, safety, security, building automation and audio/visual (A/V). In addition, the cabling systems must allow the homeowner to move/add/remove home computer, audio and security equipment and associated cabling.

Conventionally, cabling, such as low voltage data cabling, is permanently installed after the building is framed and before the drywall is installed. Once the drywall is up the building owner or its hired installers must either resort to a fish tape or remove and replace drywall to install, replace or upgrade any cables that are needed for additional or improved equipment or devices. The removal, re-installation, replacement or repair of walls can be a costly and disruptive process.

Not only are cabling system changes very difficult once the building is finished, but some energy efficient homes may have foam insulation in the walls, further complicating the addition of new cabling.

Some companies, such as Carlon or Ipex, provide flexible conduit systems that are installed inside the walls. These conduits are corrugated tubing which run to wall box outlets at specific locations inside the walls. While these systems may offer some advantages over buildings with no conduits, they are limited to specific locations within the walls and access is limited to pre-positioned outlets. Also, these conduits are difficult to upgrade with additional cables.

SUMMARY

There is provided a cable conduit system for a building frame structure having a bottom plate associated with each floor and a top plate associated with each ceiling. The system comprises a conduit stud and first and second header plates. The conduit stud has at least one cavity extending longitudinally from a first end to a second end. The first header plate is adapted to be fixedly mounted to an upper surface of the frame structure bottom plate and the second plate is adapted to be fixedly mounted to a lower surface of the frame structure top plate, respectively. The first end portion of the conduit stud is locked to the first header plate and the second end portion of the conduit stud is locked to the second header plate.

The conduit stud is a unitary structure including first and second hub members. A first side member is disposed at the first ends of the hub members and a second side member is disposed at the second ends of the hub members. Each of the hub members has oppositely disposed inner and outer surfaces and each of the side members has oppositely disposed inner and outer surfaces. The inner surfaces of the hub members and the inner surfaces of the side members form a longitudinally extending central cavity. The outer surfaces of the hub members and the inner surfaces of the side members form first and second longitudinally extending outer cavities.

Each of the header plates includes a base plate having substantially planar, oppositely disposed first and second faces and oppositely disposed first and second surfaces. A first indexing member is disposed proximate to the base plate first face, extending rigidly from the base plate first surface. A second indexing member is disposed proximate to the base plate second face. The second indexing member is pivotable from a first position, whereby the second indexing member extends from the base plate second face, to a second position, whereby the second indexing member extends from the base plate first surface. The first indexing member of one of header plates is inserted into the first outer cavity and the second indexing member is inserted into the second outer cavity, by pivoting the second indexing member from the first position to the second position, to lock each end of the conduit stud to the header plates.

Each of the base plates also has oppositely disposed first and second sides, with the first and second indexing members being disposed substantially intermediate the first and second sides. Each of the base plates also has an aperture providing communication between the first and second surfaces.

The second indexing member has a side edge pivotally mounted to the second face of the base plate.

The first and second indexing members each have an opening adapted to receive a shaft of a fastener.

At least one of the header plates is a through header plate having a tubular sleeve extending from the second surface of the base plate. An inner passageway of the sleeve being aligned with the aperture.

The inner surfaces of the conduit stud side members have multiple longitudinally extending notches, with one of the notches being disposed proximate to each face surface of the side member.

The cable conduit system further comprises at least one outlet box. Each outlet box includes a housing having a rear surface, first, second, third and fourth sides. A tubular sleeve extends from the rear surface, with an inner passageway of the sleeve providing communication with the interior of the outlet box. A flexible retainer tab extends outwardly from an outer surface of the first and second sides of the housing. A distal end portion of the outlet box sleeve is received in an opening of one of the conduit stud hub members and the retainer tabs are received in the notches of the conduit stud side members to mount the outlet box to the conduit stud.

The cable conduit system further comprises a level assembly including a housing having oppositely disposed side surfaces. A flexible retainer tab extends outwardly from each side surface. A bubble level is mounted in the housing. The retainer tabs are received in the notches of the conduit stud side members to mount the level assembly to the conduit stud.

The cable conduit system further comprises a firestop assembly including a firestop fitting having a stepped-cylindrical shape defining first and second longitudinally adjacent cavities. A distal end portion of the through header plate sleeve is received in the first cavity to mount the firestop assembly to the header plate. An insert composed of intumescent foam is disposed in the second cavity.

The firestop fitting is comprised of first and second fitting halves, each of which includes first and second ends. The second end of the first fitting half is pivotally connected to the first end of the second fitting half. A male connector extending laterally from the first end of the first fitting half has a catch that is received in an opening in the second end portion of the second fitting half to lock the first fitting half first end to the second fitting half second end.

The first cavity of the firestop fitting has an inside diameter substantially equal to an outside diameter of the through header plate sleeve, whereby an inner surface of the first cavity frictionally grips an outer surface of the through header plate sleeve. The inside diameter of the second cavity is greater than the inside diameter of the first cavity, defining a first retainer surface. A lip extends radially inward from the second cavity inner surface, defining a second retainer surface. The insert halves are retained in the second cavity of each of the fitting halves by frictional engagement with the retainer surfaces.

BRIEF DESCRIPTION OF THE DRAWINGS

The present disclosure may be better understood and its numerous objects and advantages will become apparent to those skilled in the art by reference to the accompanying drawings in which:

FIG. 3 is an exploded view of the lower portion of the cable conduit system of FIG. 1;

FIG. 4 is an enlarged end view of the conduit stud of FIG. 1;

DETAILED DESCRIPTION

Figure 1:
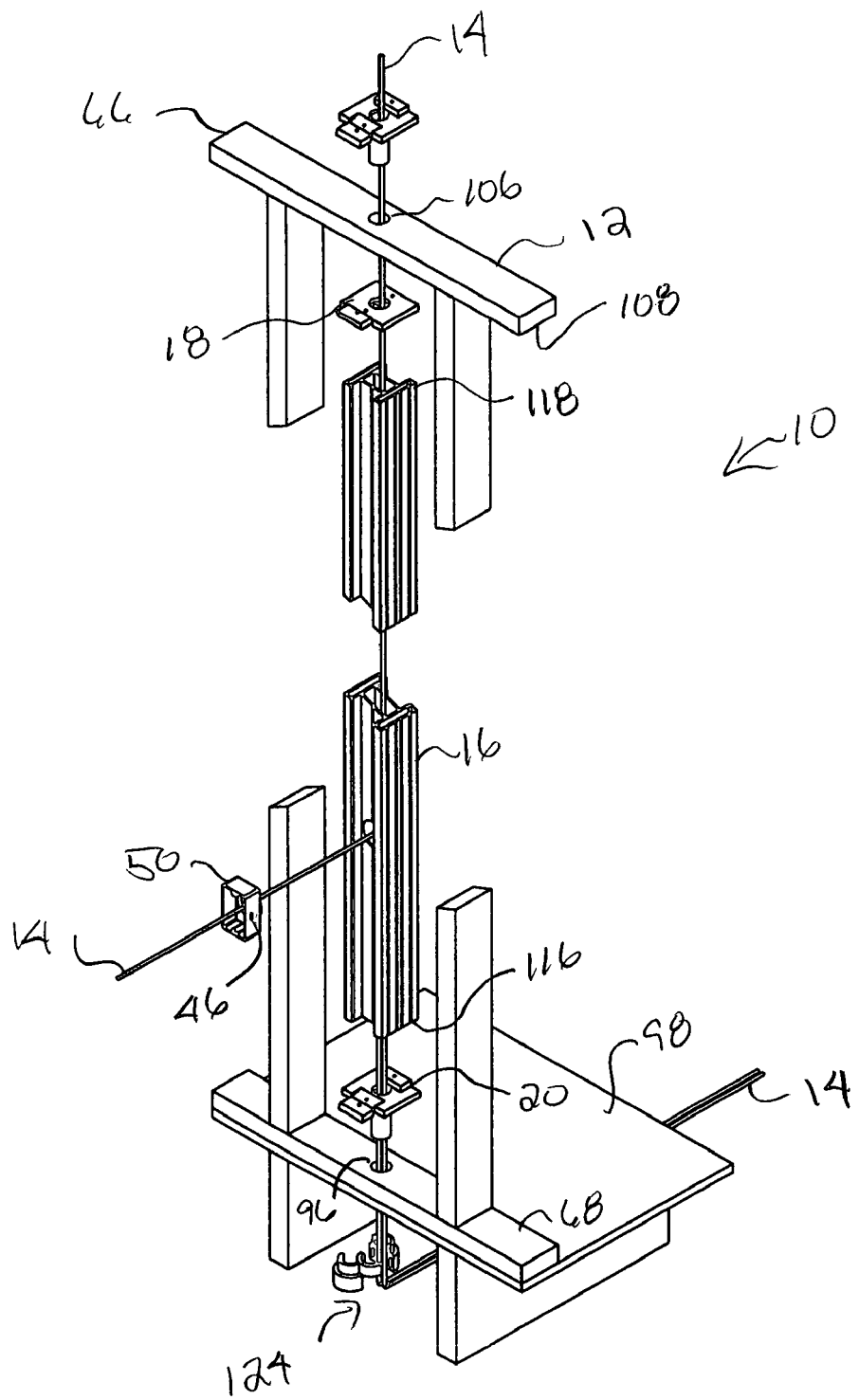
FIG. 1 is an exploded perspective view of a building wall frame having a cable conduit system in accordance with the disclosure.

With reference to the drawings wherein like numerals represent like parts throughout the several figures, a cable conduit system in accordance with the present disclosure is generally designated by the numeral 10. The cable conduit or pathway is installed in the building frame structure 12 during normal construction of the building frame, and may be a part of the building support structure. The cable conduit system 10 provides pathways for cables 14 to be installed inside the walls of a building later, after construction has been completed. The cable conduit system 10 includes a conduit stud 16 that is mounted to the building frame structure by a blind header plate 18 and a through header plate 20.

With reference to FIG. 4, the conduit stud 16 may be molded or extruded from recycled polymeric materials or virgin polymeric compounds, and may include a metallic, carbon, or other trace material to allow use of stud finder. Alternatively, the conduit stud 16 may be roll formed from metal sheet stock. In either case, the materials are dimensionally stable with regard to changes in ambient material (minimizing nail pops) and allow the conduit stud 16 to be easily cut to length with common tools. The width W of the conduit stud 16 is compatible with conventional lumber material dimensions. For example, a first embodiment of the conduit stud 16 has a width W of 3½ inches, which corresponds with the width of conventional 2"×4" studs.

In the embodiment shown in the drawings, the conduit stud 16 includes substantially parallel first and second hub members 22, 24 extending laterally from a first side member 26 to a second side member 28. A void defined by the inner surfaces 30, 30' of the hub members 22, 24 and the inner surfaces 32, 32' of the side members 26, 28 defines a longitudinally extending central cavity 34 that may be used as a pathway for cabling 14, such as data cables. Two voids defined by the outer surfaces 36, 36' of the hub members 22, 24 and the inner surfaces 32, 32' of the side members 26, 28 define first and second longitudinally extending outer cavities 38, 40 that may be used to provide additional longitudinal pathways.

The two side members 26, 28 may be formed as hollow tubular structures to reduce the amount of material required to form the side members 26, 28 without substantially reducing their mechanical strength. The inner surfaces 32, 32' of the side members 26, 28 have a longitudinally extending notch 42 positioned proximate to the face surfaces 44 for receiving mounting tabs 46, 48 on the outlet boxes 50 and level assembly 52, as discussed in greater detail below. Grooves 54 are formed in surfaces 36, 36' of the conduit stud 16 to facilitate accurately drilling openings 190 for the installation of outlet boxes 50 and in surfaces 56, 56' of the conduit stud 16 to facilitate accurately drilling holes for the horizontal passage of crossing cables. Adhesive strips 58 may be mounted to the face surfaces 44 of the side members 26, 28 to aid in the installation of sheet rock wall panels.

Figure 2:
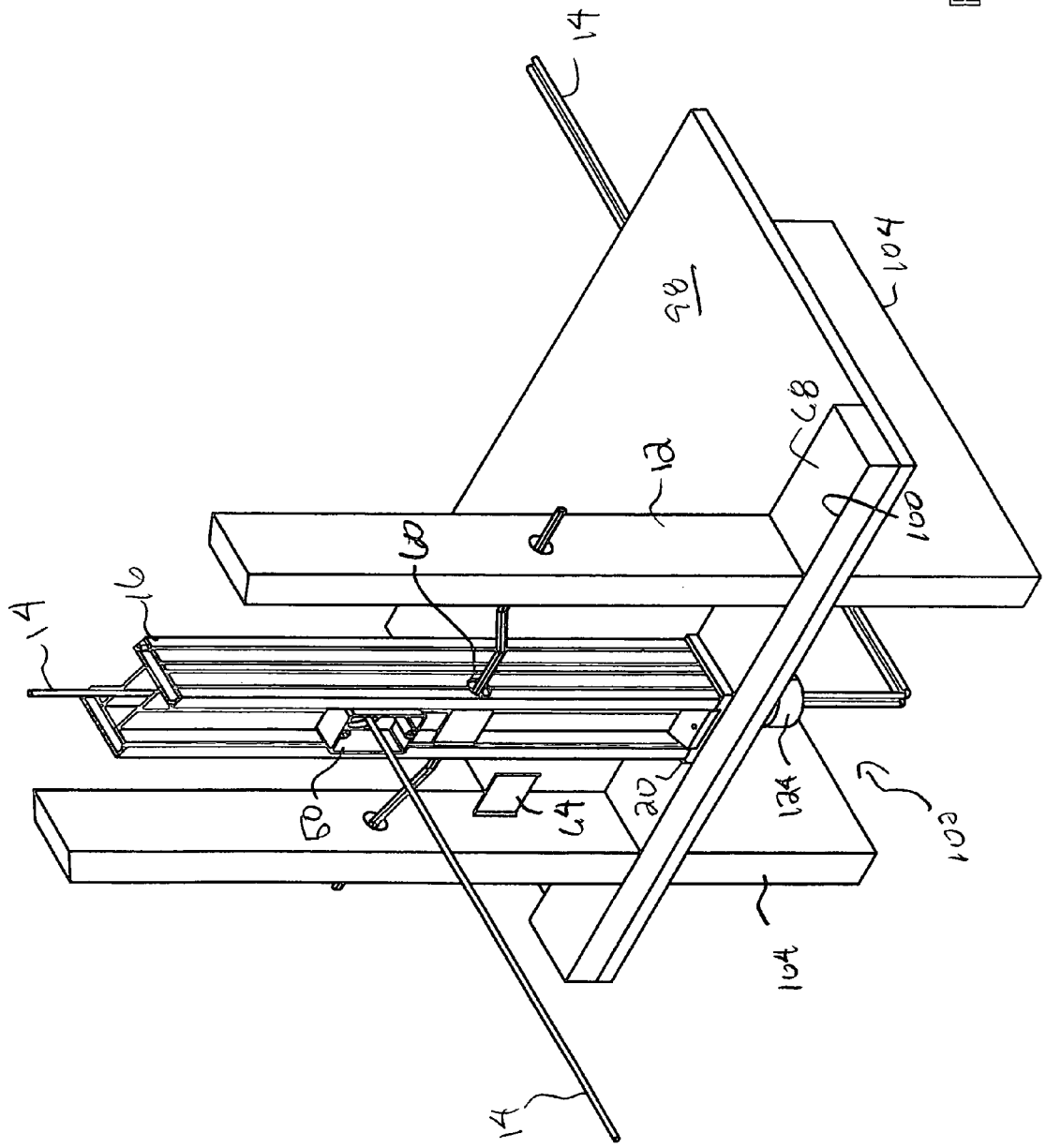
FIG. 2 is an enlarged perspective view of the lower portion of the cable conduit system and building wall frame of FIG. 1.

As shown in FIG. 2, the outer cavities 38, 40 can also be used to provide a lateral pathway by drilling openings 60 through the face portions 62 of the first and second side members 26, 28. If cabling is disposed in either of the outer cavities 38, 40 (FIG. 4), a metal plate 64 is installed to protect the cable by inserting the end portions of the metal plate 64 into the conduit stud notches 42.

Figure 6:
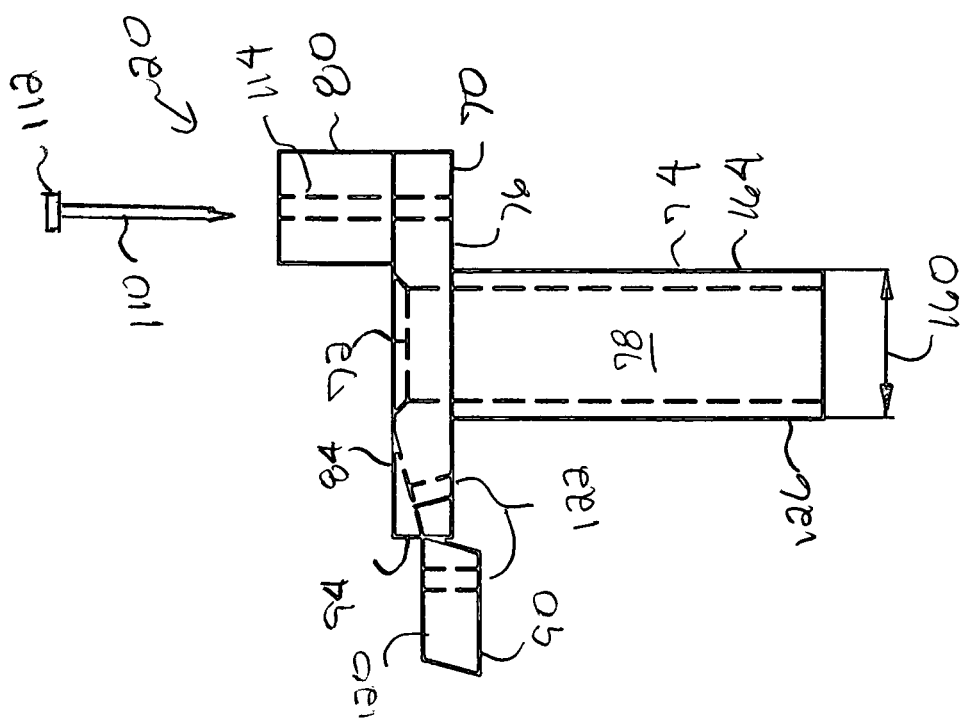
FIG. 6 is an enlarged side view of the through header plate of FIG. 1.
Figure 5:
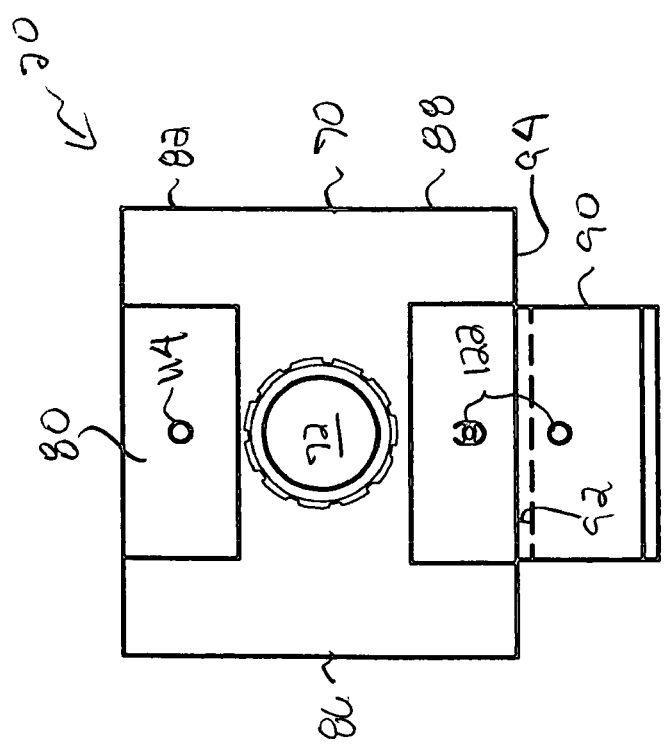
FIG. 5 is an enlarged top view of the through header plate of FIG. 1.
Figure 8:
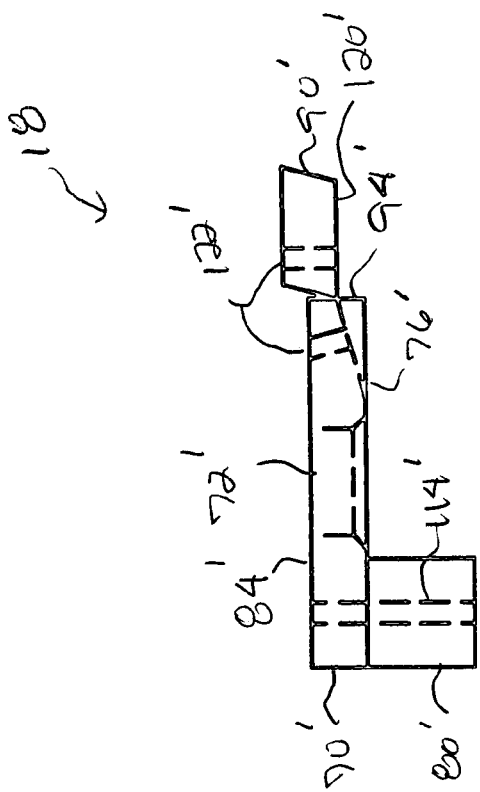
FIG. 8 is an enlarged side view of the blind header plate of FIG. 1.
Figure 7:
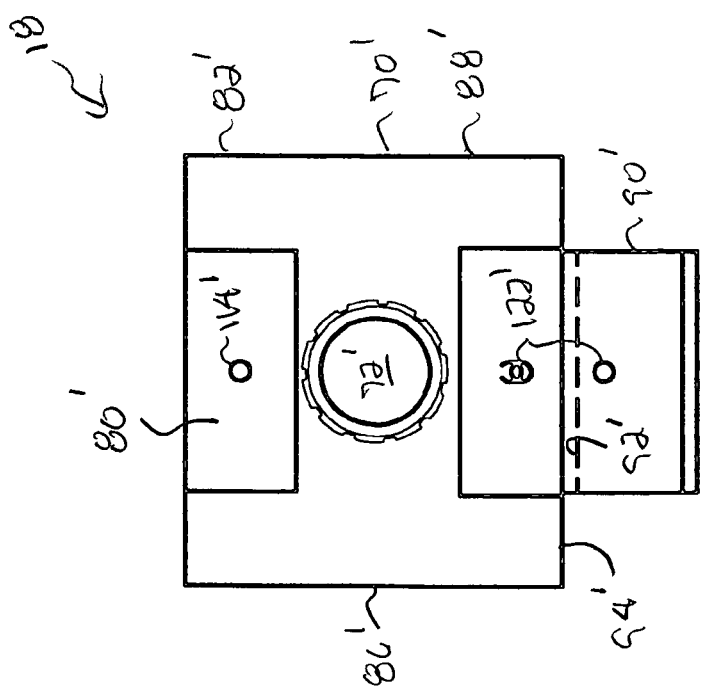
FIG. 7 is an enlarged bottom view of the blind header plate of FIG. 1.

As shown in FIG. 1, a through header plate 20 and a blind header plate 18 position and mount each conduit stud 16 to the top and bottom plates 66, 68 of a wall frame 12. With reference to FIGS. 5 and 6, the through header plate 20 includes a horizontal base plate 70 having a central aperture 72 and a tubular sleeve 74 extending from the bottom surface 76 of the base plate 70, with the inner passageway 78 of sleeve 74 being aligned with aperture 72. A first indexing member 80 extends rigidly upward from the first face portion 82 of the base plate top surface 84 substantially intermediate the oppositely disposed first and second sides 86, 88 of the base plate 70. A second indexing member 90 has a side edge 92 pivotally connected to the second face 94 of the base plate 70. With reference to FIGS. 7 and 8, the blind header plate 18 has a similar construction, including a base plate 70' having a central aperture 72', a first indexing member 80' extending rigidly downward from the first face portion 82' of the base plate bottom surface 76' substantially intermediate the base plate first and second sides 86', 88', and a second indexing member 90' having a side edge 92' pivotally mounted to the base plate second face 94'.

To install one of the conduit studs 16, it must first be determined whether it is likely that cabling 14 will be supplied through the top, the bottom, or possibly either the top or the bottom. For example, in two story buildings, cabling 14 will probably be supplied to first floor conduit stud 16 through the bottom since it is easier to run cables 14 horizontally through a basement then through the first floor walls. Cabling 14 may be supplied to second floor conduit studs 16 through the top (with horizontal cable runs in an attic) or through the bottom from an aligned first floor conduit stud 16. For single story buildings, cabling 14 may be supplied through either the top or the bottom.

With additional reference to FIG. 2, if cabling 14 is to be supplied from a basement through the bottom of the conduit stud 16, a hole 96 is drilled through the bottom plate 68 and the subfloor 98, providing communication from the upper surface 100 of the bottom plate 68 to the cavity 102 between the framing joists 104. The sleeve 74 of a through header plate 20 is inserted through the hole 96 until the base plate bottom surface 76 engages the bottom plate upper surface 100. If cabling 14 is to be supplied from an attic through the top of the conduit stud 16, a hole 106 is drilled through the top plate 66, providing communication from the lower surface 108 of the top plate 66 to the cavity between the framing joists. The sleeve 74 of a through header plate 20 is inserted through the hole 106 until the base plate bottom surface 76 engages the top plate lower surface 108. If cabling 14 is to be supplied to a second floor conduit stud 16 from a basement and through a first floor conduit stud 16, a hole 106 is drilled through the second floor bottom plate 68, the second floor subfloor 98, and the first floor top plate 66, providing communication from the upper surface 100 of the second floor bottom plate 68 to the lower surface 108 of the first floor top plate 66. The sleeve 74 of a through header plate is inserted through the hole 106 until the base plate bottom surface 76 engages the bottom plate upper surface 100. The through header plate 20 is secured to the bottom plate 68 or top plate 66 by inserting the shaft 110 of a fastener 112, such as a nail or a screw, through an opening 114 in the first indexing member 80 and hammering the nail/torquing the screw such that the fastener shaft 110 penetrates the bottom/top plate 68, 66.

An end 116 of the conduit stud 16 is positioned on the through header base plate 70 such that the first indexing member 80 is received within one of the outer cavities 38, 40. If cabling 14 will not be supplied through the opposite end 118 of the conduit stud 16, a blind header plate 18 is positioned on this end 118 of the conduit stud 16 such that the first indexing member 80' is received within the same outer cavity 38, 40 that the first indexing member 80 of the through header plate 20 is received in, and the conduit stud 16 is positioned to extend vertically. The blind header plate 18 is secured to the bottom/top plate 68, 66 by inserting the shaft 110 of a fastener 112 through the first indexing member opening 114' and engaging the bottom/top plate 68, 66 with the fastener 112. If cabling 14 may be supplied through the opposite end 118 of the conduit stud 16, a blind header plate 18 is positioned on this end 118 of the conduit stud 16 such that the first indexing member 80' is received within the same outer cavity 38, 40 that the first indexing member 80 of the through header plate 20 is received in, and the conduit stud 16 is positioned to extend vertically. The bottom/top plate 68, 66 is marked at the axis of the base plate aperture 72', the blind header plate 18 and conduit stud 16 are removed, and a hole 106 is drilled through the bottom/top plate 68, 66, and the second floor bottom plate 68, the second floor subfloor 98 if necessary. The sleeve 74 of a through header plate 20 is inserted through the hole 96, 106 until the base plate bottom surface 76 engages the bottom/top plate 68, 66. The through header plate 20 is secured to the bottom/top plate 68, 66 by inserting the shaft 110 of a fastener 112 through the first indexing member opening 114 and engaging the bottom/top plate 68, 66 with the fastener 112. Each end 116, 118 of the conduit stud 16 is positioned on one of the through header plate base plates 70 such that the first indexing members 80 are received within one of the outer cavities 38, 40.

The second indexing members 90, 90' of the through/blind header plates 20, 18 are pivoted such that the lower surface 120, 120' of the second indexing member 90, 90' contacts the upper surface 84, 84' of the base plate 70, 70' and a portion of the second indexing member 90, 90' is received within the other outer cavity 40, 38. The conduit stud 16 is locked in the through/blind header plates 20, 18 by inserting the shaft 110 of a fastener 112 through an opening 122, 122' in each second indexing member 90, 90' and engaging the bottom/top plate 68, 66 with the fastener 112.

Figure 9:
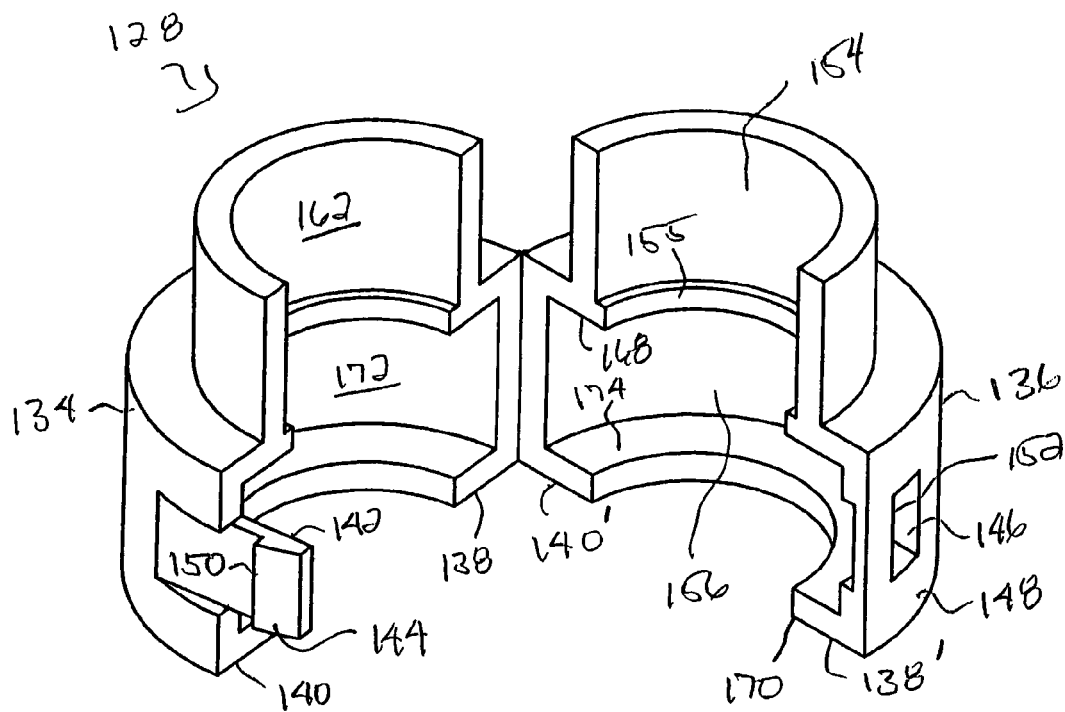
FIG. 9 is an enlarged perspective view of the firestop fitting of FIG. 1.
Figure 10:
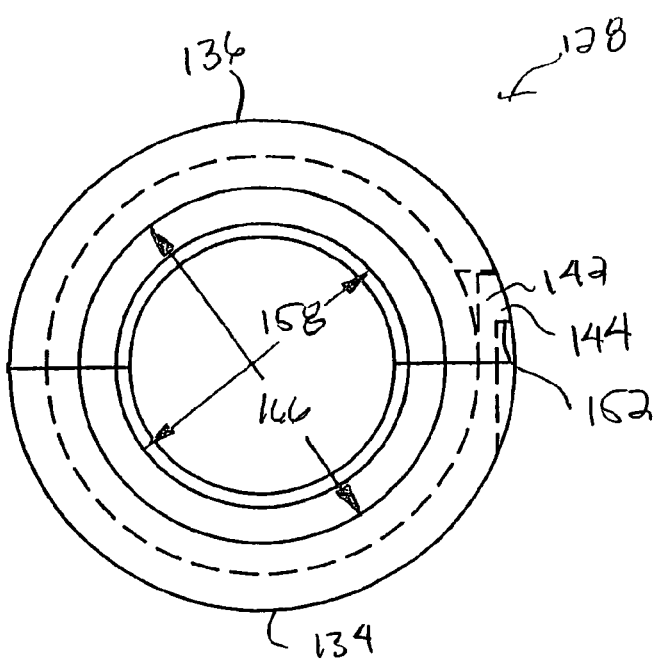
FIG. 10 is an enlarged top view, partly in phantom, of the firestop fitting of FIG. 1.
Figure 11:
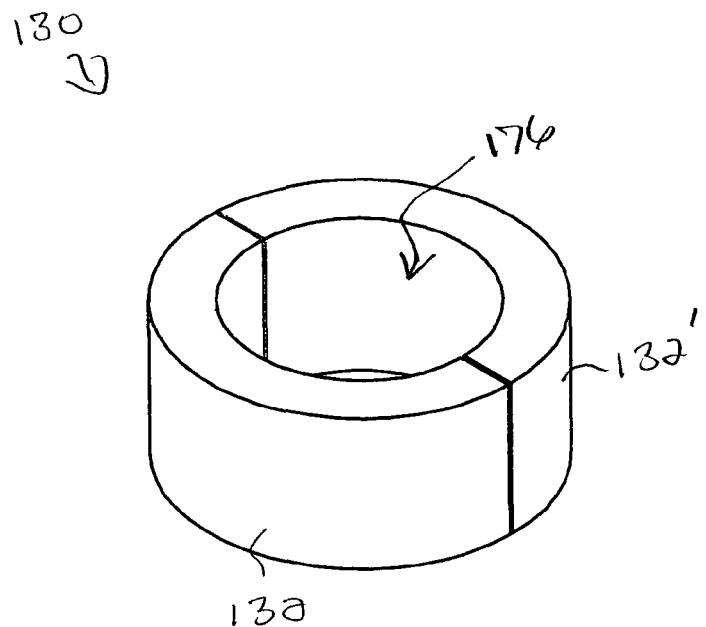
FIG. 11 is an enlarged perspective view of the intumescent foam insert of FIG. 1.

With additional regard to FIGS. 9, 10 and 11, a firestop assembly 124 may be mounted to the end portion 126 of each through header plate sleeve 74. Each firestop assembly 124 includes a firestop fitting 128 and an intumescent foam insert 130. The insert 130 is comprised of semi-cylindrical first and second insert halves 132, 132'. The firestop fitting 128 is comprised of first and second fitting halves 134, 136, with the second end 138 of the first fitting half 134 being pivotally connected to the first end 140' of the second fitting half 136. A male connector 142 extending laterally from the first end 140 of the first fitting half 134 includes a catch 144 that is received in an opening 146 in the second end portion 148 of the second fitting half 136. A shoulder 150 on the catch 144 engages a surface 152 of the opening 146 to lock the first fitting half first end 140 to the second fitting half second end 138', forming a cylinder having longitudinally adjacent first and second cavities 154, 156 separated by a radially extending lip 155.

The inside diameter 158 of the first cavity 154 is substantially equal to the outside diameter 160 of the through header plate sleeve 74 such that the first cavity inner surface 162 frictionally grips the sleeve outer surface 164 when the firestop assembly 124 is mounted to the through header plate sleeve 74. The inside diameter 166 of the second cavity 156 is greater than the inside diameter 158 of the first cavity 154, defining a first retainer surface 168. At the longitudinally opposite end of the second cavity 156, a lip 170 extends radially inward from the second cavity inner surface 172 defining a second retainer surface 174. One of the insert halves 132, 132' is retained in the half of the second cavity 156 of each of the fitting halves 134, 136 by frictional engagement with the retainer surfaces 168, 174. When the first fitting half first end 140 is locked to the second fitting half second end 138', the first insert half 132 abuts the second insert half 132' to form a cylinder. In the event of a fire, heat generated by the fire will cause the intumescent foam insert 130 to expand to fill the opening 176 between the two insert halves 132, 132', or to fill the gap between the insert 130 and any cabling 14 disposed within the opening 176, thereby sealing the firestop assembly 124, the through header plate sleeve 74, and the conduit stud 16 against entry of the fire.

Figure 12:
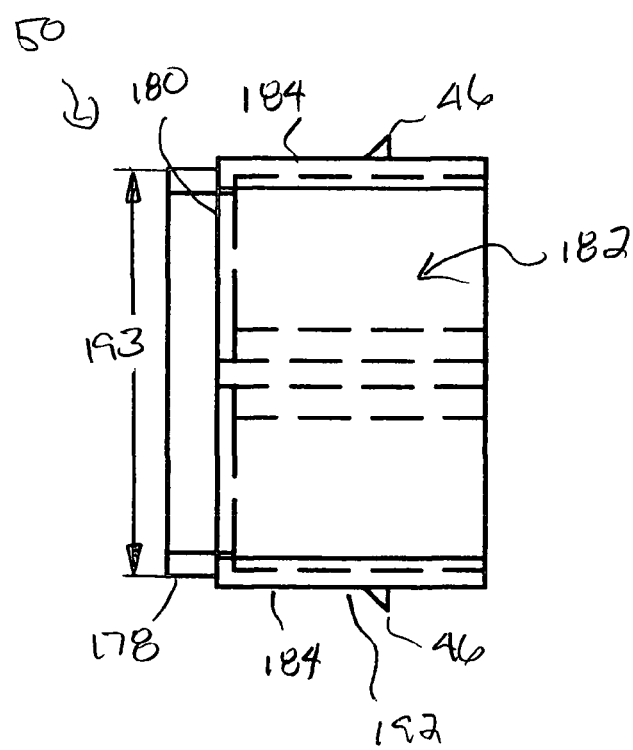
FIG. 12 is an enlarged top view, partly in phantom, of the outlet box of FIG. 1.
Figure 14:
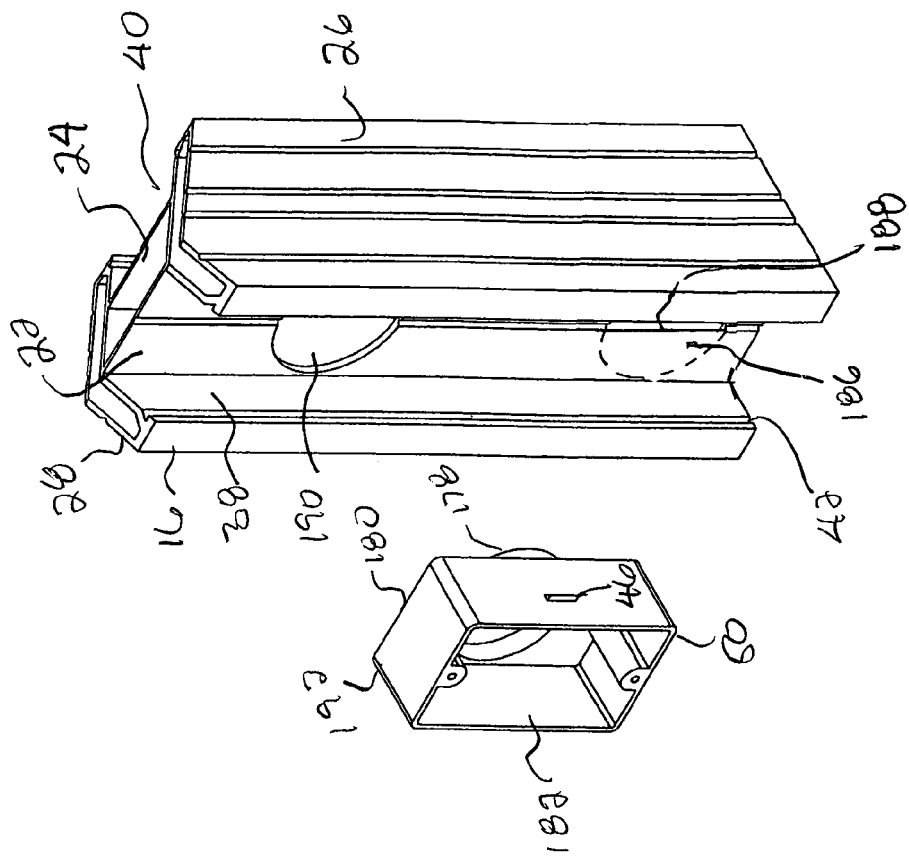
FIG. 14 is an enlarged, exploded, perspective view of an outlet box and conduit stud

With additional reference to FIGS. 12 and 14, outlet boxes 50 may be mounted to the conduit stud 16. Each of the outlet boxes 50 has a sleeve 178 projecting from the rear surface 180, providing communication with the interior 182 of the outlet box 50. In addition, a flexible retainer tab 46 extends from each outer side surface 184 of the outlet box 50. The conduit stud 16 may have outlet box knockouts 186 distributed along the longitudinal length of the conduit stud hub members 22, 24. A metallic, carbon or other sensor material 188 affixed to each knockout 186 facilitates location of the knockouts 186 with a stud finder after installation of gypsum board/sheet rock. Removal of one of the knockouts 186 creates an opening 190 through the associated hub member 22, 24. Alternatively, a hole saw may be used to create an opening 190 at any location along the longitudinal length of the conduit stud hub member 22, 24. The outlet box 50 is mounted to the conduit stud 16 by aligning the sleeve 178 with the opening 190 and inserting the outlet box rear portion 192 into the conduit stud outer cavity 38, 40, whereby sleeve 178 is received within opening 190 and retainer tabs 46 are received in the notches 42 of the conduit stud side members 26, 28. The inside diameter of openings 190 are equal to the outside diameter 193 of sleeve 178 plus a clearance distance, such that sleeve 178 may be easily inserted into opening 190.

Figure 13:
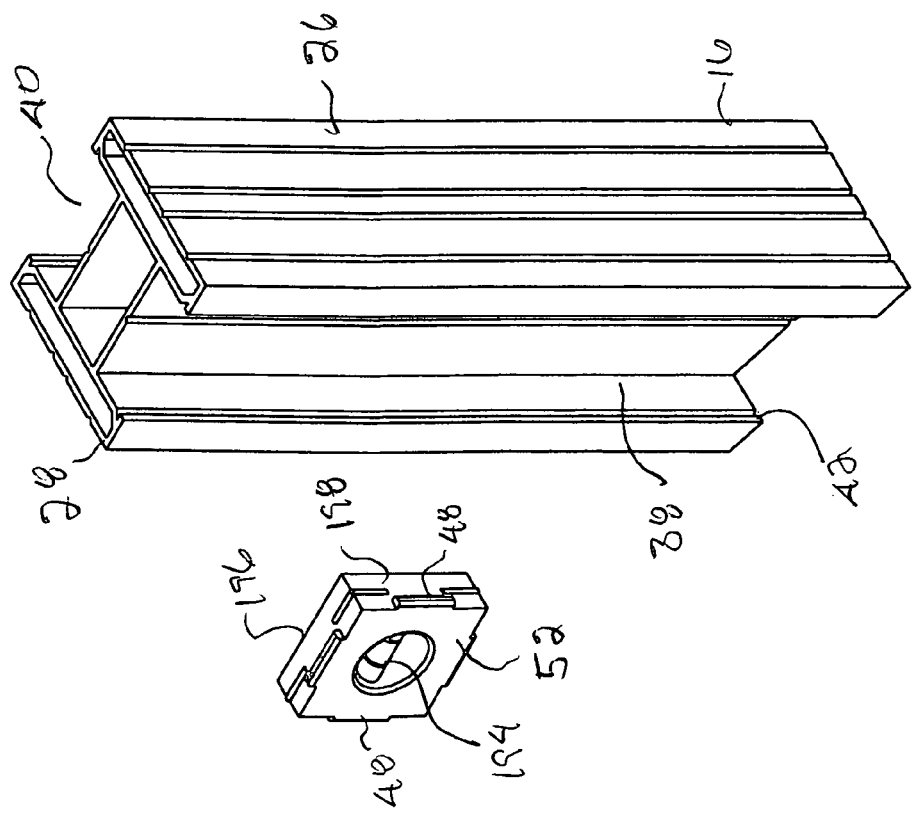
FIG. 13 is an enlarged, exploded, perspective view of a level assembly and conduit stud.

With additional reference to FIG. 13, a level assembly 52 may be used to facilitate orienting each conduit stud 16 in a vertical position. The level assembly 52 includes a bubble level 194 mounted in a housing 196. A flexible retainer tab 48 extends from each outer side surface 198 of the housing 196. The level assembly 52 is mounted to the conduit stud 16 by inserting the level assembly 52 into the conduit stud outer cavity 38, 40, whereby retainer tabs 48 are received in the notches 42 of the conduit stud side members 26, 28. The level assembly 52 may be either permanently installed or removed from the conduit stud 16 after the header plates 18, 20 are mounted to the bottom/top plate 68, 66.

It should be appreciated that the subject cable conduit system 10 has numerous advantages over conventional cabling practices. The cable conduit system 10 provides multiple use pathways as an integral component of the building framing 12. Network wiring decisions may be delayed until the homeowners have fully defined their needs and are prepared to invest in a network. The cable conduit system 10 simplifies the installation of follow-on cabling. The cable conduit system 10 provides the capability to remove and replace cabling 14 over the life of the home as technology and the homeowner's needs change. The cable conduit system 10 mounts to conventional load bearing timber, provides a cabling path around such timber, does not require holes to be drilled into load bearing house frame materials, made of materials that are immune to dry rot, is mold resistant, are NFPA fire rated and are NEC electrically rated. The cable conduit system 10 may be made from recycled materials and/or colored orange, gray, white or any other color to indicate use.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A cable conduit system for a building frame structure having a bottom plate associated with each floor and a top plate associated with each ceiling, the system comprising:
   a conduit stud defining at least one longitudinally extending cavity, the conduit stud being a unitary structure having oppositely disposed first and second ends and first and second end portions; and
   first and second header plates, the first header plate being adapted to be fixedly mounted to an upper surface of the frame structure bottom plate and the second plate being adapted to be fixedly mounted to a lower surface of the frame structure top plate, respectively, the first end portion of the conduit stud being locked to the first header plate and the second end portion of the conduit stud being locked to the second header plate.

2. The cable conduit system of claim 1 wherein the conduit stud includes:
   first and second hub members, each hub member extending laterally from a first end to a second end;
   a first side member disposed at the first ends of the hub members; and
   a second side member disposed at the second ends of the hub members;
   wherein each of the conduit stud side members is a hollow tubular structure.

3. The cable conduit system of claim 2 wherein each of the hub members has oppositely disposed inner and outer surfaces and each of the side members has oppositely disposed inner and outer surfaces, the inner surfaces of the hub members and the inner surfaces of the side members defining a longitudinally extending central cavity and the outer surfaces of the hub members and the inner surfaces of the side members defining first and second longitudinally extending outer cavities.

4. The cable conduit system of claim 3 wherein each of the header plates includes:
   a base plate having substantially planar, oppositely disposed first and second faces and oppositely disposed first and second surfaces;
   a first indexing member disposed proximate to the base plate first face, the first indexing member extending rigidly from the base plate first surface; and
   a second indexing member disposed proximate to the base plate second face, the second indexing member being pivotable from a first position, whereby the second indexing member extends from the base plate second face, to a second position, whereby the second indexing member extends from the base plate first surface;
   wherein the first indexing member of one of header plates is inserted into the first outer cavity and the second indexing member is inserted into the second outer cavity, by pivoting the second indexing member from the first position to the second position, to lock each end of the conduit stud to the header plates.

5. The cable conduit system of claim 4 wherein each of the base plates also has oppositely disposed first and second sides, the first and second indexing members being disposed substantially intermediate the first and second sides.

6. The cable conduit system of claim 4 wherein the second indexing member has a side edge pivotally mounted to the second face of the base plate.

7. The cable conduit system of claim 4 wherein the first and second indexing members each define an opening adapted to receive a shaft of a fastener.

8. The cable conduit system of claim 4 wherein each of the base plates defines an aperture providing communication between the first and second surfaces.

9. The cable conduit system of claim 8 wherein at least one of the header plates is a through header plate including a tubular sleeve extending from the second surface of the base plate, an inner passageway of the sleeve being aligned with the aperture.

10. The cable conduit system of claim 3 wherein outer surfaces of the conduit stud hub members and side members define at least one longitudinally extending groove.

11. The cable conduit system of claim 3 wherein the inner surfaces of the conduit stud side members define a plurality of longitudinally extending notches, one of the notches being disposed proximate to a face surface of the side member.

12. The cable conduit system of claim 11 further comprising at least one outlet box, each outlet box including:
   a housing having a rear surface, first, second, third and fourth sides, the rear surface and sides defining an interior;

a tubular sleeve extending from the rear surface, an inner passageway of the sleeve providing communication with the interior of the outlet box; and a flexible retainer tab extending outwardly from an outer surface of the first and second sides of the housing;

wherein a distal end portion of the outlet box sleeve is received in an opening of one of the conduit stud hub members and the retainer tabs are received in the notches of the conduit stud side members to mount the outlet box to the conduit stud.

13. The cable conduit system of claim 12 wherein the conduit stud hub members include at least one knockout, wherein removing one of the knockouts creates the opening for receiving the outlet box sleeve.

14. The cable conduit system of claim 11 further comprising a level assembly including:

a housing having oppositely disposed side surfaces;

a flexible retainer tab extending outwardly from each side surface; and a bubble level mounted in the housing;

wherein the retainer tabs are received in the notches of the conduit stud side members to mount the level assembly to the conduit stud.

15. The cable conduit system of claim 9 further comprising a firestop assembly including:

a firestop fitting having a stepped-cylindrical shape defining first and second longitudinally adjacent cavities separated by radially extending lip, a distal end portion of the through header plate sleeve being received in the first cavity to mount the firestop assembly to the header plate; and an insert composed of intumescent foam disposed in the second cavity.

16. The cable conduit system of claim 15 wherein the firestop fitting is comprised of:

first and second fitting halves, each of the fitting halves including first and second ends, the second end of the first fitting half being pivotally connected to the first end of the second fitting half, a second end portion of the second fitting half defining an opening; and a male connector extending laterally from the first end of the first fitting half has a catch that is receivable in the second end fitting opening in the second end portion of the second fitting half to lock the first fitting half first end to the second fitting half second end.

17. The cable conduit system of claim 16 wherein the insert is comprised of semi-cylindrical first and second insert halves disposed in the second cavity of the first and second fitting halves, respectively.

18. The cable conduit system of claim 17 wherein the first cavity of the firestop fitting has an inside diameter substantially equal to an outside diameter of the through header plate sleeve, whereby an inner surface of the first cavity frictionally grips an outer surface of the through header plate sleeve.

19. The cable conduit system of claim 18 wherein an inside diameter of the second cavity is greater than the inside diameter of the first cavity, defining a first retainer surface and the firestop fitting further includes a lip extends radially inward from the second cavity inner surface, defining a second retainer surface, the insert halves being retained in the second cavity of each of the fitting halves by frictional engagement with the retainer surfaces.

20. The cable conduit system of claim 2 wherein each of the hub members has oppositely disposed inner and outer surfaces and each of the side members has oppositely disposed inner and outer surfaces, the inner surfaces of the hub members and the inner surfaces of the side members defining a longitudinally extending central cavity and the outer surfaces of the hub members and the inner surfaces of the side members defining first and second longitudinally extending outer cavities, each of the outer cavities having three sides.

21. A cable conduit system for a building frame structure having a bottom plate associated with each floor and a top plate associated with each ceiling, the system comprising:

first and second header plates, the first header plate being adapted to be fixedly mounted to an upper surface of the frame structure bottom plate and the second plate being adapted to be fixedly mounted to a lower surface of the frame structure top plate, respectively, each of the header plates including first and second indexing members; and a conduit stud comprising a unitary structure having oppositely disposed first and second ends and first and second end portions, the conduit stud including first and second hub members, each hub member extending laterally from a first end to a second end and having oppositely disposed inner and outer surfaces, a first side member disposed at the first ends of the hub members and having oppositely disposed inner and outer surfaces, and a second side member disposed at the second ends of the hub members and having oppositely disposed inner and outer surfaces, the inner surfaces of the hub members and the inner surfaces of the side members defining a longitudinally extending central cavity and the outer surfaces of the hub members and the inner surfaces of the side members defining first and second longitudinally extending outer cavities;

wherein the conduit stud is mounted by inserting the first and second indexing members of the first header plate in the first and second outer cavities of the first end portion of the conduit stud and inserting the first and second indexing members of the second header plate in the first and second outer cavities of the second end portion of the conduit stud.

22. A cable conduit system for a building frame structure having a bottom plate associated with each floor and a top plate associated with each ceiling, the system comprising:

first and second header plates, the first header plate being adapted to be fixedly mounted to an upper surface of the frame structure bottom plate and the second plate being adapted to be fixedly mounted to a lower surface of the frame structure top plate, respectively, each of the header plates including a base plate having substantially planar, oppositely disposed first and second faces and oppositely disposed first and second surfaces.

a first indexing member disposed proximate to the base plate first face, the first indexing member extending rigidly from the base plate first surface, and a second indexing member disposed proximate to the base plate second face, the second indexing member having a side edge pivotally mounted to the second face of the base plate, the second indexing member being pivotable from a first position, whereby the second indexing member extends from the base plate second face, to a second position, whereby the second indexing member extends from the base plate first surface; and a conduit stud comprising a unitary structure having oppositely disposed first and second ends and first and second end portions, the conduit stud including first and second hub members, each hub member extending laterally from a first end to a second end and having oppositely disposed inner and outer surfaces, a first side member disposed at the first ends of the hub members and having oppositely disposed inner and outer surfaces, and a second side member disposed at the second ends of the hub members and having oppositely disposed inner and outer surfaces, the inner surfaces of the hub members and the inner surfaces of the side members defining a longitudinally extending central cavity and the outer surfaces of the hub members and the inner surfaces of the side members defining first and second longitudinally extending outer cavities;

wherein the conduit stud is mounted by inserting the first indexing members of the first and second header plates in the first outer cavity of the first and second end portions of the conduit stud and pivoting the second indexing members of the first and second header plates from the first position to the second position, whereby the second indexing members are inserted into the second outer cavity of the first and second end portion of the conduit stud.

* * * * *